(12) United States Patent
Souissi et al.

(10) Patent No.: US 8,442,504 B2
(45) Date of Patent: May 14, 2013

(54) METHOD AND APPARATUS FOR DISTRIBUTED DATA TRANSFER OVER MULTIPLE INDEPENDENT WIRELESS NETWORKS

(75) Inventors: Slim Salah Souissi, San Diego, CA (US); Michael Scott Andrews, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 106 days.

(21) Appl. No.: 13/075,110

(22) Filed: Mar. 29, 2011

(65) Prior Publication Data

US 2012/0058752 A1 Mar. 8, 2012

Related U.S. Application Data

(63) Continuation-in-part of application No. 11/754,934, filed on May 29, 2007, now Pat. No. 7,917,129, which is a continuation of application No. 09/938,357, filed on Aug. 23, 2001, now Pat. No. 7,224, 964.

(60) Provisional application No. 60/227,427, filed on Aug. 23, 2000.

(51) Int. Cl.
*H04M 3/42* (2006.01)

(52) U.S. Cl.
USPC .................... 455/414.2; 455/414.1; 455/557; 455/556.2

(58) Field of Classification Search ............... 455/414.2, 455/414.1, 556.2, 557
See application file for complete search history.

(56) References Cited

U.S. PATENT DOCUMENTS

| | | | |
|---|---|---|---|
| 5,574,979 A | 11/1996 | West | |
| 5,805,581 A | 9/1998 | Uchida | |
| 6,009,087 A | 12/1999 | Uchida | |
| 6,138,158 A | 10/2000 | Boyle | |
| 6,185,208 B1 | 2/2001 | Liao | |
| 6,343,318 B1 | 1/2002 | Hawkins | |
| 6,389,010 B1 | 5/2002 | Kubler | |
| 6,397,259 B1 | 5/2002 | Lincke | |
| 2006/0062242 A1 | 3/2006 | Dacosta | |
| 2008/0037541 A1 | 2/2008 | Souissi | |
| 2012/0331111 A1* | 12/2012 | Wu et al. | ........................ 709/219 |

OTHER PUBLICATIONS

Extended European Search Report in European Application 12165792.8, dated Sep. 6, 2012.

* cited by examiner

*Primary Examiner* — Creighton Smith
(74) *Attorney, Agent, or Firm* — AlbertDhand LLP (57) ABSTRACT

Embodiments of the invention provide for methods and apparatus for fragmenting a single message and sending the message fragments over multiple independent networks to a single receiving unit. The receiving unit then reassembles the message fragments to generate the original message. One embodiment of an apparatus according to the invention is a wireless radio frequency modem that can both receive and transmit fragmented messages over multiple independent networks.

20 Claims, 9 Drawing Sheets

METHOD AND APPARATUS FOR DISTRIBUTED DATA TRANSFER OVER MULTIPLE INDEPENDENT WIRELESS NETWORKS

CROSS-REFERENCE TO RELATED PATENT APPLICATIONS

This application is a Continuation-in-Part of U.S. application Ser. No. 11/754,934, filed May 29, 2007, issued on Mar. 29, 2011 as U.S. Pat. No. 7,917,129, which is a continuation of U.S. application Ser. No. 09/938,357, filed Aug. 23, 2001, issued on May 29, 2007 as U.S. Pat. No. 7,224,964, which claims priority from Provisional Application U.S. Application 60/227,427, filed Aug. 23, 2000, all of which are incorporated herein by reference in their entirety.

BACKGROUND OF THE INVENTION

The present invention is directed to methods and apparatus for wireless communications and more specifically to methods and apparatus for transferring a single fragmented message over multiple networks to a single receiving device.

New wireless Internet applications continue to drive the need for increased electromagnetic spectrum utilization in the form of an increase in bandwidth for transmitting data. Service providers and regulators are simultaneously seeking an equivalent increase in spectrum utilization. To address the above ever-present demands, a variety of different wireless networks, i.e. Advanced Mobile Phone System ("AMPS"), Global System Mobile ("GSM"), and Personal Communications Service ("PCS") were developed to transmit data using different frequencies of the radio spectrum.

In addition, several technologies have been developed for more efficient use of the radio spectrum. For instance, Frequency Division Multiple Access ("FDMA") is a data transmission technique that allows many cellular telephone users to communicate with one base station by assigning each user a different frequency channel. Code Division Multiple Access ("CDMA") is a technique that enables cellular telephone users to share a given frequency channel by breaking each transmitted signal into many packets of data, each of which is tagged with the cell phone user's code, wherein the packets are spread over a band of frequencies and then reassembled at the receiving end. Cellular Digital Packet Data ("CDPD") is another data packet technique similar to CDMA. Orthogonal Frequency Division Multiple access ("OFDM") is a technique wherein a data message is split into fragments, and using a single transmitting source, the fragments are simultaneously transmitted over a cluster of (adjacent) radio frequency ("RF") channels with all channels using the same modulation/coding type and controlled by the same protocol rules. Finally, Time Division Multiple Access ("TDMA") is a technique for channel sharing that assigns each cell phone user a repeating time slot in a frequency channel, any other type of WAN, LAN, WAN/LAN router, or some combination thereof. Other network technologies include, but are not limited to, Worldwide Interoperability for Microwave Access (WiMAX), 1× Evolution-Data Optimized ("EVDO")/IEEE 802.11, Discover, Offer, Request, Acknowledgement ("DORA")/IEEE 802.11, Long Term Evolution ("LTE")/IEEE 802.11, Universal Mobile Telecommunications Service ("UMTS")/IEEE 802.11, High Speed Packet Access ("HSPA")/IEEE 802.11.

Moreover, the current wireless communications infrastructure as described allows most United States and worldwide cellular regions to provide for multiple independent standards. Some infrastructure base station equipment and client side terminal devices, such as cellular telephones, also have the capability to operate according to multiple standards. Nonetheless, inefficient utilization of the above-described communications infrastructure occurs for a number of reasons.

First, many client side wireless modem devices operate according to only one standard. This is also true for wireline modems. In addition, most wireline base station equipment is incapable of operating according to multiple standards because of the more constrictive electromagnetic nature of copper wire and coaxial cable used with this equipment. Second, although multiple wireless standards may occupy the same region and not interfere with each other, these standards typically occupy principally the same frequencies in the electromagnetic spectrum, or very nearly so. This limits a perspective user to one air standard or another at any given time. Examples include AMPS and CDMA in the same geographical area or GSM and CDMA in the same geographical area. In addition, inefficient utilization may occur due to various interference issues among the above cellular techniques, which may also limit a prospective cellular telephone user to one air standard or another, i.e. limiting use to AMPS, which uses CDPD technique or IS-95, which uses the CDMA technique when both are available in the same region.

Finally, the current hardware used to facilitate wireless communications limits the utilization of the available bandwidth. One such example is presently available multimode radio technology, i.e. iDEN/GSM and ANALOG/CDMA radios and tri-mode cellular telephones. iDEN/GSM and ANALOG/CDMA radios increase the effective footprint of a coverage area by enabling roaming across multiple technologies, and tri-mode phones can operate using three different standards. However, each described unit is only capable of operating according to one standard at a time.

The limitation to one air standard or the other at any given time (in a multiple standard geographic region) prevents both carriers and users from maximizing the utilization of the available infrastructure for wireless data traffic. What is needed are techniques and apparatus that can be used to increase utilization of the existing infrastructure and simultaneously provide users with the greatest possible bandwidth for data traffic given the existing infrastructure.

SUMMARY OF THE INVENTION

Embodiments of the present invention are directed at addressing the above-mentioned shortcomings, disadvantages, and problems of the prior art. Embodiments of the invention provides for a wireless radio frequency ("RF") modem constructed to cooperatively operate with an external message split controller, said external message split controller operative to split a message into a plurality of message fragments according to one or more predetermined criteria, and to include with each said message fragment an identifier of where said message fragment was located within said message, to enable each said message fragment to be transmitted to said RF modem as a separate electromagnetic signal via a separate selected transmitting source over a corresponding selected radio frequency, said RF modem comprising: an RF front end operative, for each said separate electromagnetic signal, to receive the signal, to detect the radio frequency over which the signal was transmitted and to downconvert the signal to generate a corresponding baseband signal; a baseband processing unit coupled to said RF front end and operative to detect and decode each said baseband signal generated by said RF front end to generate each said corresponding transmitted message fragment; a central processing unit ("CPU") coupled to said RF front end and to said baseband processing unit, said CPU operative to detect said identifiers; and a message fragment combining unit coupled to said CPU for combining said message fragments as a function of said identifier to generate the original message.

In another embodiment, a method for transmitting a multiple independent messages across multiple independent networks from a single transmitting unit to a single receiving unit, the method comprises, selecting at least two available transmitting sources for transmitting the multiple independent messages to the receiving unit; selecting a first independent network from the multiple independent networks for transmitting a first of the multiple independent messages from the single transmitting unit to the single receiving unit according to at least one predetermined criteria; selecting a second independent network from the multiple independent networks for transmitting a second of the multiple independent messages from the single transmitting unit to the single receiving unit according to at least one predetermined criteria; transmitting the first independent message from the single transmitting unit to the single receiving unit via the first independent network and simultaneously sending the second independent message from the single transmitting unit to the single receiving unit via the second independent network.

In still another embodiment, a multimode device configured for running at least two applications simultaneously comprises, a first communication interface for communicating with a first server via a first network; a second communication interface for communicating with a second server via a second network; wherein one of the at least two applications communicates with the first server via the first network and another of the at least two applications communicates with the second server via the second network.

In another embodiment, A multimode transmitting device configured for transmitting multiple independent files across multiple independent networks, the multimode transmitting device comprises, a first communication interface for communicating with a first of the multiple independent networks; a second communication interface for communicating with a second of the multiple independent networks; wherein the device is configured to transmit a first of the multiple independent files across the first independent network while simultaneously transmitting a second of the multiple independent files across the second independent network In one embodiment, the modem also comprises a modem message split controller for performing message fragmentation to enable an outgoing message to be split into multiple message fragments for transmission over multiple independent networks. Moreover, the external message split controller may be included in a proxy server connected to the Internet, a network controller for a data communications network or a transmitter controller for a data communications network.

Embodiment of the invention also provides for a method for transmitting a message to a single receiving unit over a plurality of independent transmitting sources, said method comprising the steps of: (a) selecting at least two available transmitting sources for transmitting a message to an intended receiving unit and selecting a corresponding radio frequency for each said selected transmitting source; (b) splitting said message into a plurality of message fragments according to at least one predetermined criteria and including with each said message fragment an identifier of where said fragment was located within said message; (c) causing each said message fragment to be transmitted to said receiving unit as a separate electromagnetic signal via a separate said selected transmitting source over the corresponding selected radio frequency; (d) receiving, in said receiving unit, each said separate electromagnetic signal and extracting the corresponding message fragment; and (e) combining, in said receiving unit, said message fragments as a function of said identifiers to generate the original message. The message fragmentation step may be performed according to one or more Quality of Service criteria, including cost, battery life, latency, network congestion, and the message fragments may be sent over either homogeneous or heterogeneous networks.

Some embodiments of the invention can increase the effective throughput of a wireless device, to increase utilization of the existing wireless communications infrastructure and to provide users with the greatest possible bandwidth for transmitting data given the existing infrastructure, especially in areas where multiple wireless/wireline networks coexist, by simultaneously using those multiple networks to send a fragmented message to a single receiver unit.

Some embodiments of the invention provide for the aggregation of compatible cellular and wireless Local Area Network ("LAN") standards in a given cellular region, thus enabling multiple, independent modes of operation in a wireless device to achieve maximum radio efficiency and the greatest possible bandwidth.

In some embodiments the effective data transmission rate may be increased by an amount proportional to the subscriber hardware/software capabilities.

Some embodiments of the invention also enable network interfacing, i.e., LAN-to-Wide Area Network ("WAN"), WAN-to-LAN, multi-WAN-to-LAN, multi-LAN-to-WAN, multi-LAN-to-multi-WAN and multi-WAN-to-multi-LAN.

Some embodiment of the invention can provide for more effective communications hardware, such as a universal wireless data modem. Such a device is useful, for example, for secured communications, for robust data communications, and for large-bandwidth, fixed wireless applications. Some embodiments can also enable high speed wireless internet data communication applications.

BRIEF DESCRIPTION OF THE DRAWINGS

The foregoing and other aspects of embodiments of the invention will become more readily apparent by reference to the following detailed description, when taken in conjunction with the accompanying drawings, wherein.

DETAILED DESCRIPTION OF THE PREFERRED EMBODIMENTS

According to various embodiments of the invention, a message is split into at least two message fragments and each message fragment is sent simultaneously (or sequentially) via multiple independent transmitting sources in fundamental ways over several radio frequency ("RF") channels, using one or more air interfaces. Although different in fundamental ways, OFDM (Orthogonal Frequency Division Multiple Access) technology is similar to embodiments of the invention in that a given message is split and sent over a selected cluster of RF channels. However, the OFDM technology is not as effective as embodiments of the invention in increasing bandwidth for data transmission because in OFDM only one transmission source is used, the same modulation and coding scheme is used by all of the selected channels, and a single protocol stack is used by all of the selected channels. Whereas, in various embodiments of the invention, the message fragments are sent via multiple independent sources. Accordingly, the selected channels use different signaling schemes, and each network utilized is not limited by having to operate using the same protocol stack.

Table 1 below illustrates the key difference between the present invention and the prior art OFDM technology.

TABLE 1

| | OFDM | Embodiments of Invention |
|---|---|---|
| Source of the message | One single source | Multiple independent sources |
| Modulation/coding type | The same modulation/coding type is used by all the channels | Channels use different (independent) signaling schemes |
| Protocol stack | One protocol stack for all channels | Every network may be using a different protocol stack |

In various other embodiments of the invention, at least two independent files can be transmitted across at least two independent networks (i.e. no fragmentation and no fragment identification). In one example, one file can be a voice stream and another file can be a video stream. Other example file types can include, but are not limited to, an HTTP session, a data file, and/or an FTP file. In one embodiment, two (or more) separate applications can be running simultaneously on a multimode device where one (or more) application communicates with a first server via a first network and a second (or more) application communicates with a second server via a second independent network.

Figure 1:
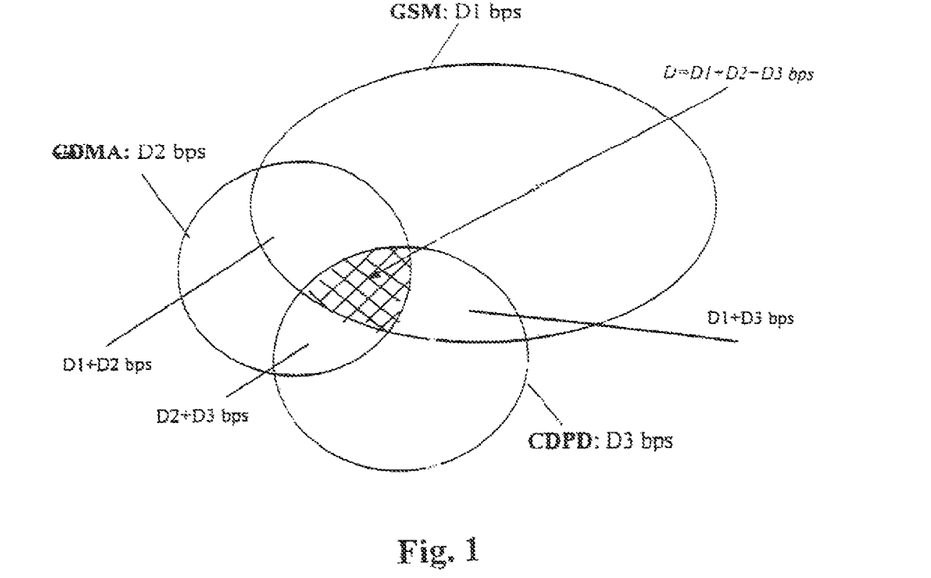
FIG. 1 illustrates an effective throughput/coverage performance in an exemplary cellular region that can be achieved according to one embodiment of the invention.

FIG. 1 illustrates an effective throughput and coverage performance that can be achieved according to one embodiment of the present invention. Three independent transmitting sources (or "networks") are available in the exemplary cellular region illustrated in FIG. 1: GSM having a data transmission rate or throughput of D1 bits per second ("bps"); CDMA having a throughput of D2 bps; and CDPD having a throughput of D3 bps. FIG. 1 shows that one embodiment may be used, for example, to split a message into three message fragments and to send a different message fragment via each network. In such a case, the effective throughput would be the aggregate of the throughput for the individual networks, or D1+D2+D3. Alternatively, three independent files or messages can be sent each via one of the networks. In still another embodiment, one file can be sent via one network and another message can be fragmented with the fragments each being sent via one of the other networks.

Figure 2:
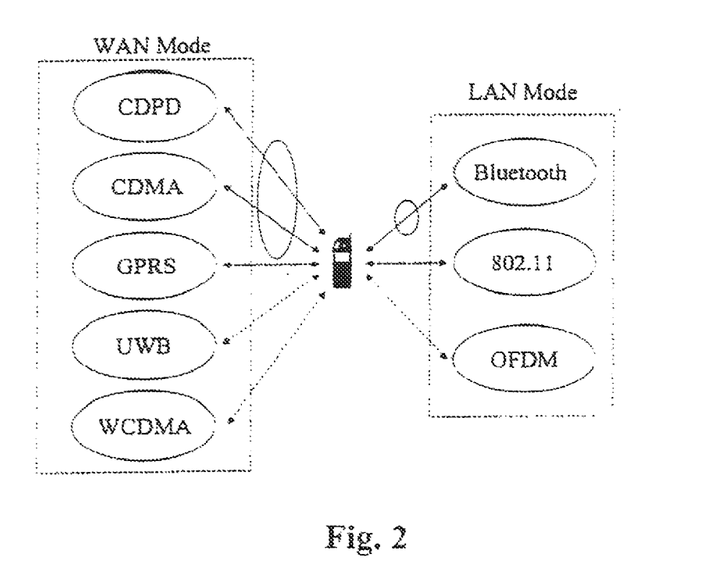
FIG. 2 is a diagram showing a parallel multimode operation of a modem device according to one embodiment of the invention.

FIG. 2 is a diagram showing a parallel multimode operation of a modem device according to one embodiment of the present invention. This device is constructed to operate in either a LAN or a WAN mode, and supports a plurality of standards in each mode, i.e., CDPD, CDMA, GPRS, UWB, WiMAX, LTE, 1×EVDO, DORA, HSPA and/or WCDMA in the WAN mode, and Bluetooth, IEEE 802.11, OFDM in the LAN mode. The illustrated device according to one embodiment of the present invention is further constructed for simultaneous use of at least two of its compatible standards. For instance, the device might operate simultaneously with CDMA and GSM in order to increase the effective bandwidth of the data throughput to and from the modem device.

Those skilled in the art will realize that other combinations of the available standards may be utilized. Moreover, other conventional standards and even future wireless or wireline standards may be incorporated for use by the modem device to provide a maximum utilization of flexibility and bandwidth.

Figure 3:
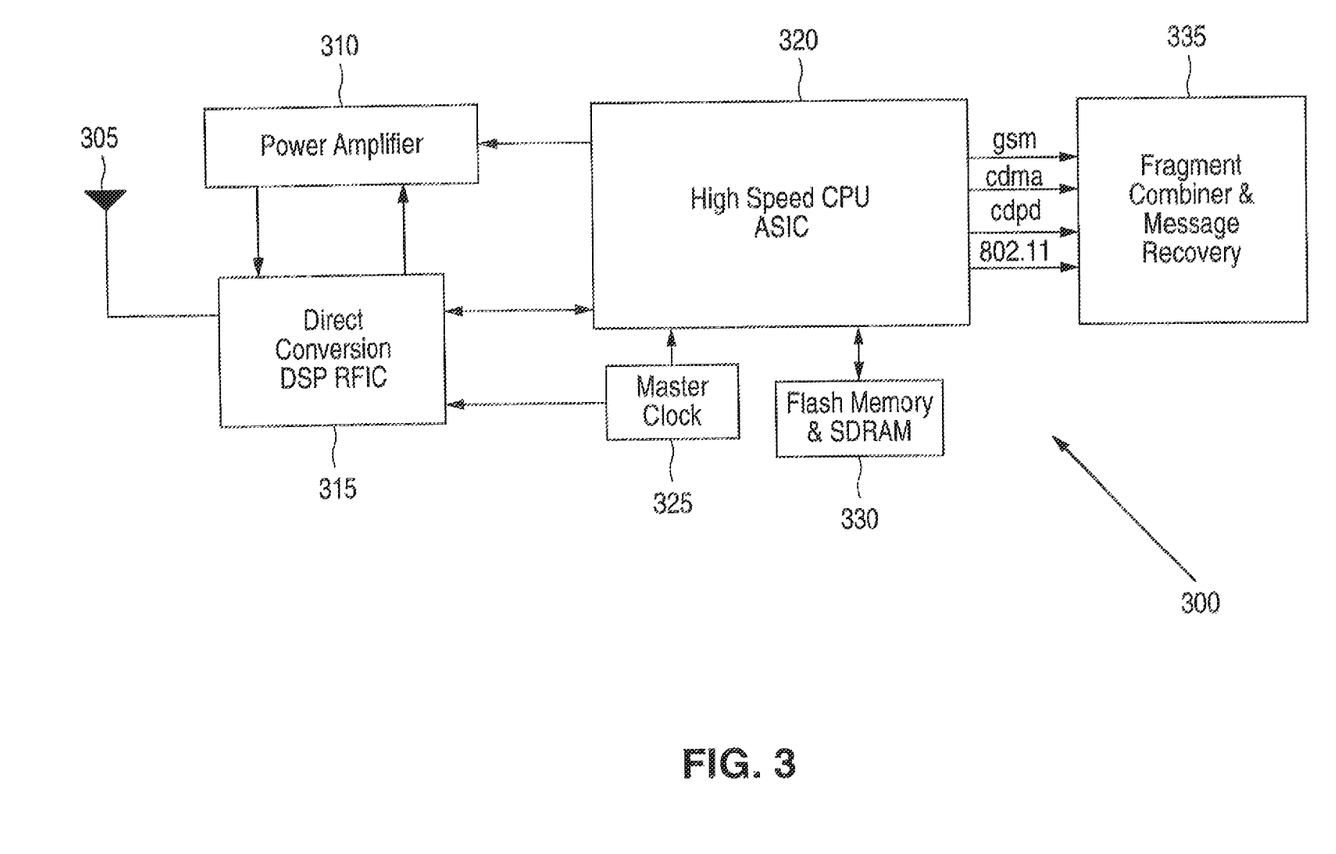
FIG. 3 is a block diagram of a multimode modem architecture according to one embodiment of the invention.

FIG. 3 is a block diagram of a multimode modem 300 according to one embodiment of the present invention. In this embodiment, RF modem 300 operates in a receive mode to receive electromagnetic signals carrying messages, each message including a stream of data bits. RF modem 300 also operates in a transmit mode to send electromagnetic signals carrying messages, each message including a stream of data bits. Modem 300 is further operative to receive simultaneously or sequentially a message that has been split into at least two message fragments, wherein each message fragment includes an identifier of where that message fragment was located within the message, which enables each message fragment to be transmitted to the RF modem as a separate electromagnetic signal via a separate selected independent communications network using a corresponding radio frequency channel. Modem 300 is also operative to recombine the message fragments into the original message.

Modem 300 comprises an antenna 305, a power amplifier 310, a software configurable direct conversion DSP RFIC 315, a high speed software configurable CPU ASIC 320, a master clock 325, a Flash memory and SDRAM 330, and a fragment combiner and message recovery unit 335. These components of modem 300 are electrically connected as illustrated by the solid lines in FIG. 3 between those components.

Antenna 305, power amplifier 310, clock 325, and memory 330 are conventional components well known on the art. A direct conversion DSP RFIC 315 is an RF front end component that is able to perform RF conversion in the receive mode so as to simultaneously receive at least two message fragments (or independent files or messages) from different transmission sources. DSP RFIC 315 is further operative, for each said separate electromagnetic signal, to receive the signal, to detect the radio frequency over which the signal was transmitted, and to downconvert the signal to generate a corresponding baseband signal. CPU ASIC 320 is preferably a conventional component that functions as a controller or processor for modem 300 and also performs baseband processing and protocol stack control. In the receive mode, CPU ASIC 320 decodes each baseband signal to generate a corresponding message fragment (or independent files or messages) having a stream of data bits and including protocol data bits and then removes the protocol data bits to enable the original message (or independent files or messages) to be recreated. In the transmit mode CPU ASIC 320 adds protocol data bits to a stream of data bits corresponding to a message and encodes the data bits into a baseband signal for processing by DSP RFIC 315. CPU ASIC 320 is further operative to detect the identifier in each message fragment. Fragment combiner 335 is also a conventional component used to recombine the message fragments into the original message as a function of the identifier included with each message fragment. Fragment combiner 335 may be integrated within CPU ASIC 320 or may be a separate component.

Figure 4:
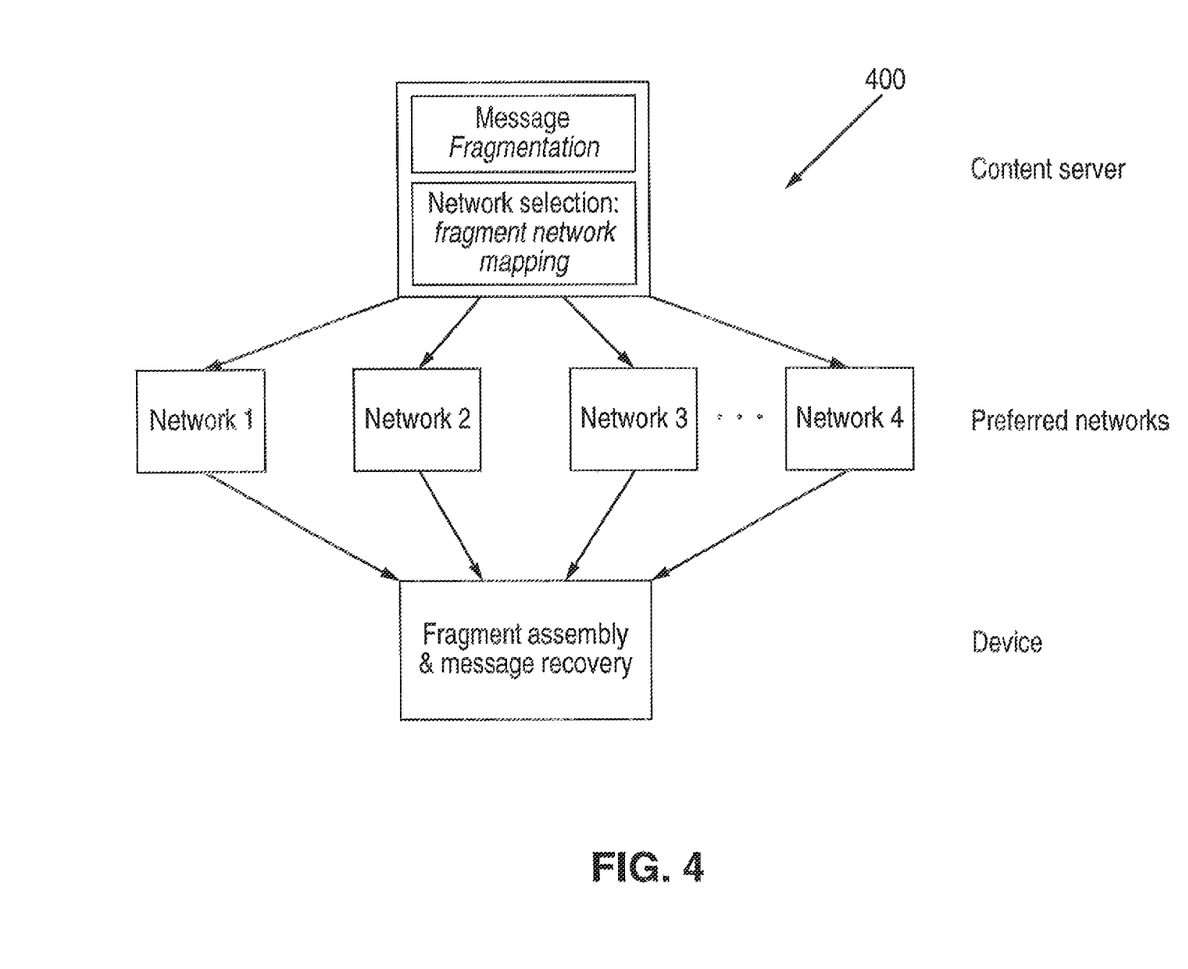
FIG. 4 is a flow chart that describes a message fragmentation and delivery method according to a one embodiment of the invention.

FIG. 4 shows a flow chart that describes a message fragmentation and delivery method 400 according to an embodiment of the present invention. In general, a message to be transmitted to a receiving device is split, preferably by a content server, into at least two message fragments and the message fragments are sent simultaneously via multiple selected transmitting sources (Networks 1 through N which may be preferred networks according to one or more predetermined criterion) over several radio frequency channels, preferably using different air interfaces (a heterogeneous transmission technique). Alternatively, multiple independent messages or files can be sent simultaneously via multiple selected transmitting sources. The message fragments (or messages) could also be sent via multiple transmitting sources using the same air interfaces (a homogeneous transmission technique). The message fragments are then reassembled by a receiving device ("terminal"), preferable a mobile device having a wireless RF modem, to generate the original message.

More specifically, after a message intended to be delivered to a terminal is broken into two or more fragments, the fragments are preferably numbered to facilitate message reassembly at the receiver end. The message fragmentation operation also preferably takes place within an externally located content server. In packed data networks, packet numbering is not required. Transmission Control Protocol/Internet Protocol ("TCP/IP") can be used to perform numbering, but transparently. Each fragment is then carried by a different network.

For example, within a geographic area where both GSM and CDMA networks are deployed, the GSM network may carry the first fragment of the message while the CDMA network may carry the second fragment of the message. Alternatively, the GSM network can carry a first message or file and the CDMA network can simultaneously carry a second message or file. The receiving device is assumed to have the capability of decoding both fragments of the message (or both messages) and of reconstructing the original message from the fragments. RF radios may be software configurable to more easily achieve this task.

There are many ways of implementing method 400. A specific example is as follows. A large streaming video is to be sent by MPEG4 encoding over a wireless connection. Assume there are two standards available in a region. For the purposes of this example, we will also assume the standards are IS-95B and CDPD, with data rates of 14400 plus 19200 bps, respectively, which are to be combined to obtain an aggregate rate of 33600 bps. The image is broken into two parts, with one standard carrying 14400/33600 or 43% of the data and the second carrying 19200/33600 or 57% of the data to obtain the aggregate transfer rate of 33600 bps. In other words, the streaming video image data is divided proportionally to match the data transfer rate of each of the available channels in order to obtain the desired increased data throughput. In another embodiment, a video stream can be sent via one network, for example the CDPD network, and a voice stream can be sent via the other network, for example the IS 95B network. In these examples, the effective data rate into the receiving device is doubled by simultaneously using the two networks to transmit the message fragments. Generally, the potential for increasing the effective data rate at the receiving device is only limited by the networks available for transmitting data, if the device is constructed with the required software and hardware capabilities.

Figure 5:
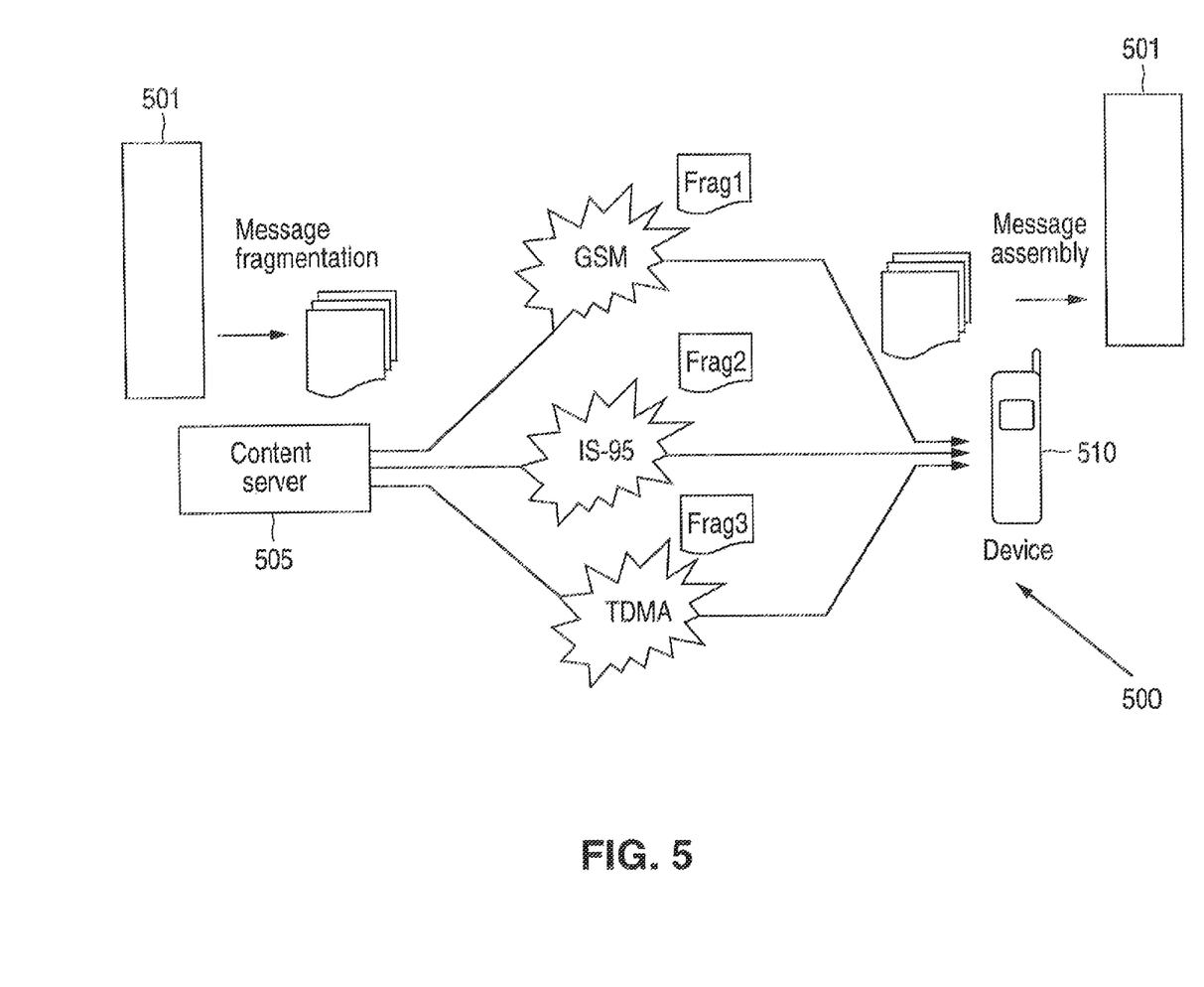
FIG. 5 is a diagram illustrating a method for fragmenting a message to be delivered across three independent networks according to one embodiment of the invention.

FIG. 5 is a diagram illustrating a method 500 for fragmenting a message to be delivered across three networks according to one embodiment of the present invention. This method can also be used to send three messages simultaneously or even two messages in which one or both of the messages are fragmented. In this example, a content server 505 splits a message 501 into three message fragments Frag1, Frag2 and Frag3. Frag1 is transmitted via a GSM network. Frag2 is transmitted via an IS-95 network, and Frag3 is transmitted via an TDMA network. Device 510, illustrated as a mobile telephone, assembles the message fragments to recreate message 501.

Figure 6:
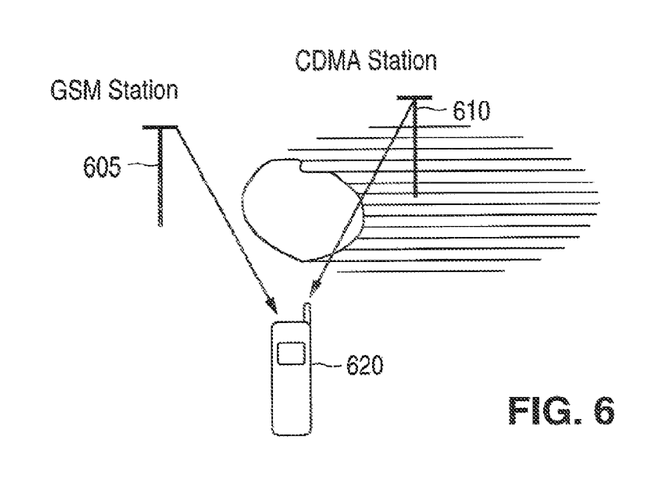
FIG. 6 is a diagram illustrating how a split message is delivered using two independent networks, where they overlap in the coverage area.

FIG. 6 is a diagram illustrating a single message being split into two message fragments and the fragments simultaneously delivered via a GSM base station and a CDMA base station, wherein device 620, illustrated as a mobile telephone recombines the message fragments to generate the original message. The GSM base station and the CDMA base station overlap in coverage area.

The operation of message fragmentation is preferably performed either by a mobile device (for uplink transmissions) or by a proxy server (for downlink transmissions). Those skilled in the art will realize that the message fragmentation operation can also take place at a mobile switching center a network controller or at a transmitter controller. For the sake of simplicity, only message fragmentation at the proxy server level is described below.

Figure 7:
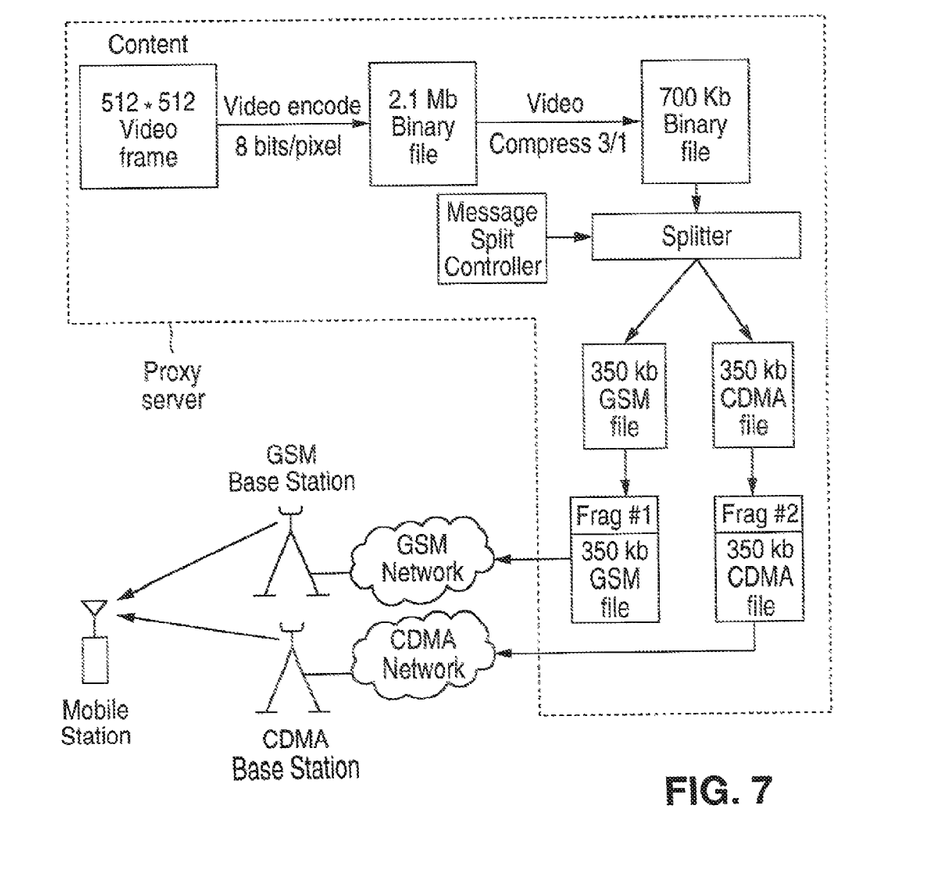
FIG. 7 is a block diagram illustrating the operation of message fragmentation at a proxy server.

FIG. 7 depicts the operation of message fragmentation at a proxy server connected to the Internet, for example, so that the message can be sent to an Internet Protocol address associated with an intended receiving unit. The proxy server includes an Internet communications adapter and a software program executed by the proxy server. A video image is used for illustration purposes. A compressed video image is divided into two fragments. A message split controller is responsible for the message split operation. The size of each fragment is determined depending upon the available bandwidth on each network selected to transmit the message fragments. In one embodiment, the message split controller is an Internet server. Some examples of suitable Internet servers can include HTTP servers and/or HTTP range servers.

Other criterion may be considered during the fragmentation process. For instance, the message may be fragmented into pieces or the route of independent files may be determined according to a Quality of Service ("QoS") criterion, such as latency, cost, required power, battery life, etc. The role of the message split controller is to orchestrate the operation of message fragmentation according to predefined QoS rules. For example, voice signals (less tolerant to network latency) may be sent on a circuit switch network while data files (more tolerant to latency) can be sent on a packet switch network. Each message fragment or message may have a QoS indicator attached to it so that the message fragment is sent using a network that satisfies the corresponding QoS requirement.

Message fragmentation can also be done at a packet level. For instance, multiple packets may be interleaved before being transmitted over the different networks, which can be either homogeneous or heterogeneous networks. Interleaving helps equalize the overall system performance in terms of latency, packet error rate, coverage, etc. Packet interleaving introduces diversity into the system.

Figure 8:
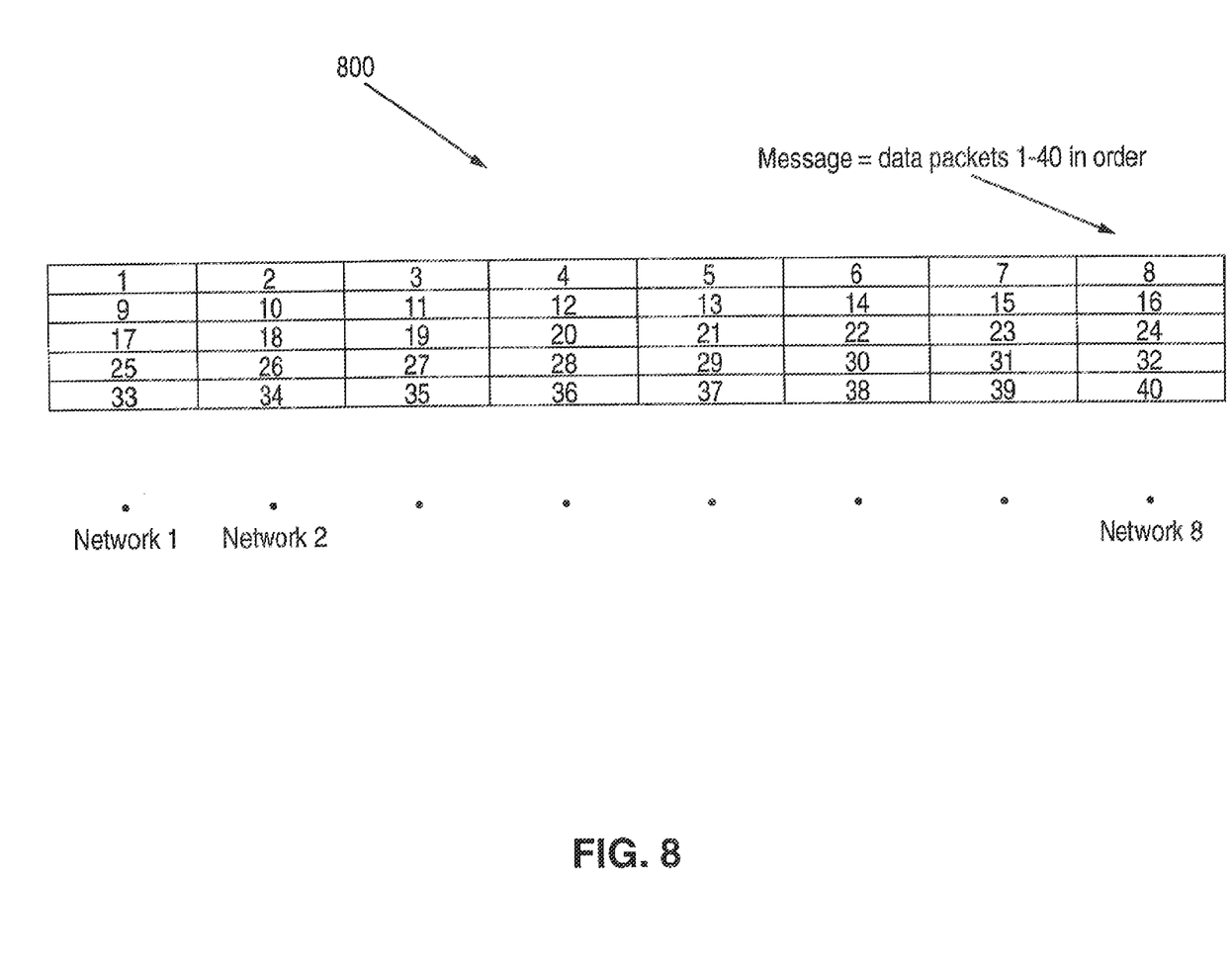
FIG. 8 is an illustration of a method according to the present invention, wherein interleaved and transmitted over multiple networks.

FIG. 8 illustrates an interleaving table 800 that may be used to facilitate data transmission according to the present invention. According to the interleaving table illustrated in FIG. 8, packets 1 through 40 are ordered row wise and transmitted column wise over Networks 1 through N. Each column of packets are sent over a different network. To illustrate the benefits of interleaving according to interleaving table 800, suppose that Network 1 is a low reliability network and that packet 1 was unsuccessfully sent over Network 1. Because of interleaving, packet 1 will be retransmitted on another network other than Network 1, thereby giving packet 1 an increased chance of being successfully received on the second try. Without packet interleaving, packet 1 would have been assigned exclusively to unreliable Network 1 and therefore would take more time than other packets to reach its final destination. This would in turn introduce backlog in Network 1 and resultantly cause the message reconstruction at the receive end to be delayed.

In the FIG. 8 illustration, interleaving is done at the packet level. However, those skilled in the art will realize that interleaving can be done at a fragment level or even at a bit level.

Referring again to FIG. 7, at the receiver end, the message is simply reconstructed by reordering all of the received packets. In addition, the selection of which networks to use may be accomplished in a number of ways. For instance, the receiving unit may monitor a cellular region to detect RF activity relative to multiple channels each supporting different standards. The receiving unit can then report to the proxy server a list of RF channels detected as well as the air interfaces used. The reported information may be used by the proxy server to split a message and transmit the message fragments in accordance with that list. Alternatively, the receiving unit may suggest to the proxy server to perform message fragmentation according to one or more preferred rules.

Moreover, the list of Existing protocols such as TCP/IP can guarantee message fragment ordering without numbering the packets prior to message transmission. In the situation where circuit switch networks are used, packets must be numbered according to any conventional numbering rule prior to transmission, and a mobile device for instance, would reassemble the received packets according to the applicable numbering rule. Finally, when embodiments of the present invention are used in the uplink, i.e. transmit content from a mobile device to a proxy server, the same steps of the process shown in FIG. 7 take place in the mobile device.

Figure 9:
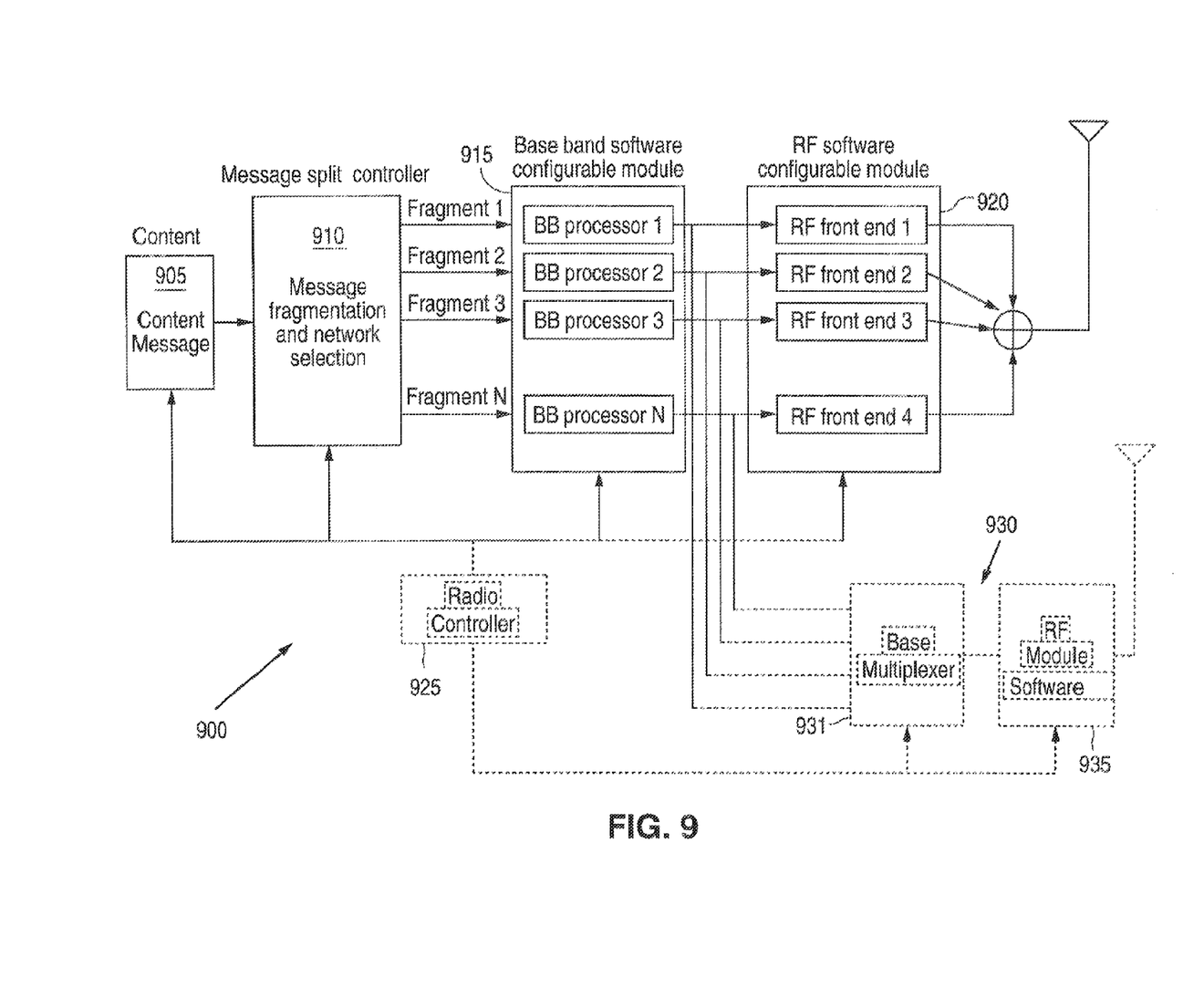
FIG. 9 is a block diagram of a one embodiment of an RF modem architecture according to the invention.

FIG. 9 is a block diagram illustrating an RF modem 900, that can be included in a mobile device, capable of message fragmentation according to an embodiment of the present invention. Modem 900 comprises all of the components as illustrated in modem 300 of FIG. 3. Specifically, modem 900 includes a suitable power amplifier device, an RFIC device capable of producing the appropriate baseband signals, and a CPU/ASIC device with suitable memory capable of recovering binary data from the baseband signals received from the conversion RFIC device and a fragment combiner and message recovery device Modem 900 further comprises a message split controller 910 coupled to the CPU/ASIC and used to fragment a message, intended for transmission, according to a predefined rule. In one embodiment, the rule of message fragmentation and/or network selection is based on a QoS criterion. These components work together to achieve the desired multi-mode packet transfers and aggregation over multiple standards and air interfaces.

The message fragments 1 through N of Message content 905 are generated by message split controller 910 and passed to base band processor 915, which can be software configurable. Baseband processor 915 can be a plurality of baseband processors 1 through N connected in parallel to simultaneously process each received message fragment. Each fragment is processed according to selected physical layer specifications. After baseband processing, the data is passed to an RF front end for up-conversion and transmission. The RF front end for FIG. 9 can be implemented in multiple ways. One exemplary implementation 920 is based on multiple RF front ends connected in parallel. Each RF front end is used to up-convert a single base band signal. An alternative RF front end 930 uses a base band multiplexer 931, which can be software programmable. The mixed signal is then up-converted using a single software configurable RF circuit 935.

Figure 10:
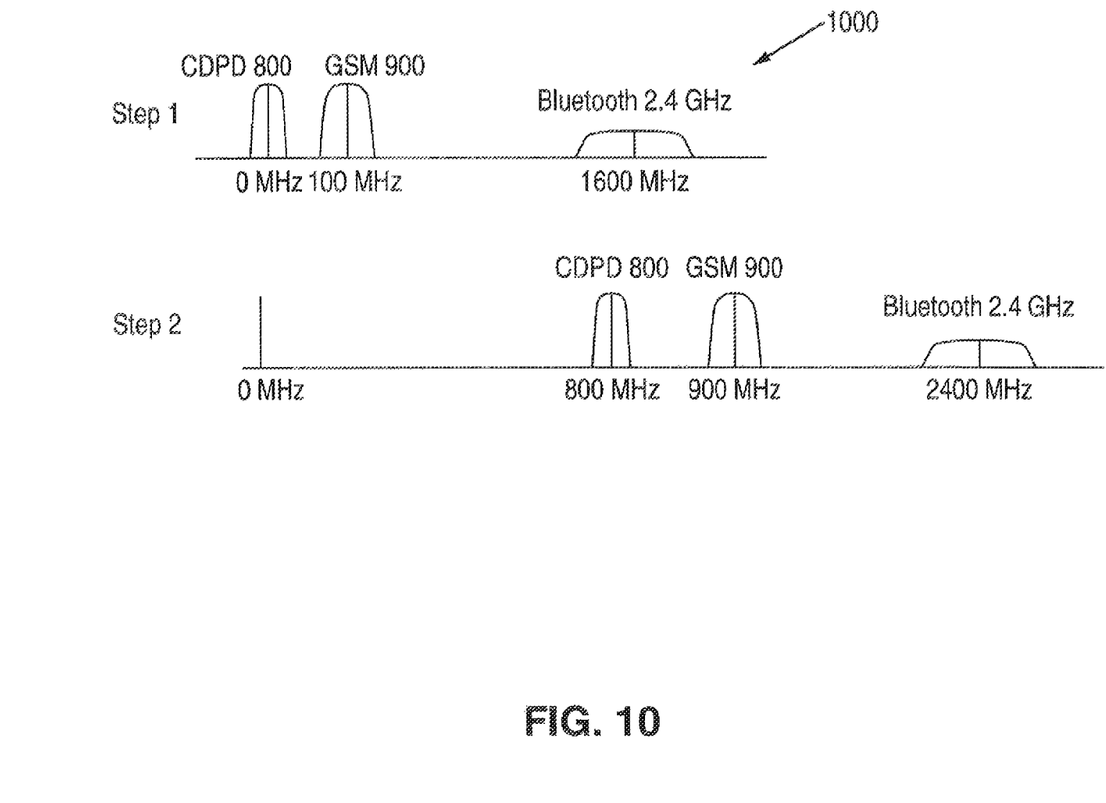
FIG. 10 illustrates an upconversion methodology when RF front end 930 of FIG. 9 is implemented.

FIG. 10 illustrates an upconversion methodology 1000 used when RF front end 930 of FIG. 9 is implanted. Step 1 consists of mixing base band signals into a single baseband signal, in this example for simultaneous transmission over a CDPD network at 800 Mhz, a GSM network at 900 Mhz, and a Bluetooth network at 2.4 GHz. The resulting signal will have an effective bandwidth equal to the frequency separation between the highest and lowest frequency signals. Step 2 of the process consists of up-converting the resulting base band signal to the required frequency.

Methodology 1000 has the unique advantage of being completely transparent to a carrier as shown by the following illustration. Assume that an aggregator for providing communications services purchases a certain amount of bandwidth from a number of carriers. Each of these carriers may be using a different technology. For instance the aggregator may have a contract with Sprint PCS (using CDMA technology) to use 100,000 wireless phone lines and another contract with AT&T (TDMA) for using another 100,000 wireless phone lines for the purpose of reselling the SPRINT and AT&T services to its customers at a lower cost with higher throughput. Now assume a customer is equipped with a wireless device that can simultaneously decode TDMA and CDMA signals, and the customer wants to download a 1 Mbyte video file to his cell phone. The following steps should take place: 1. The cell phone sends a request to the aggregator's proxy server requesting the download of a file and at same time informs the proxy that it is within coverage of both SPRINT and AT&T networks. Informing the proxy about the list of networks within coverage is optional. The proxy may already know by other means; 2. The aggregator's proxy splits the message into two portions, preferably proportional to the amount of bandwidth available on the subject networks. Each portion of the message is sent simultaneously to the cell phone using a different network, e.g. portion one via AT&T and portion two via SPRINT); and 3. The cell phone reassembles the two received data portions according to a protocol defined between the proxy and the cell phone.

Figure 11:
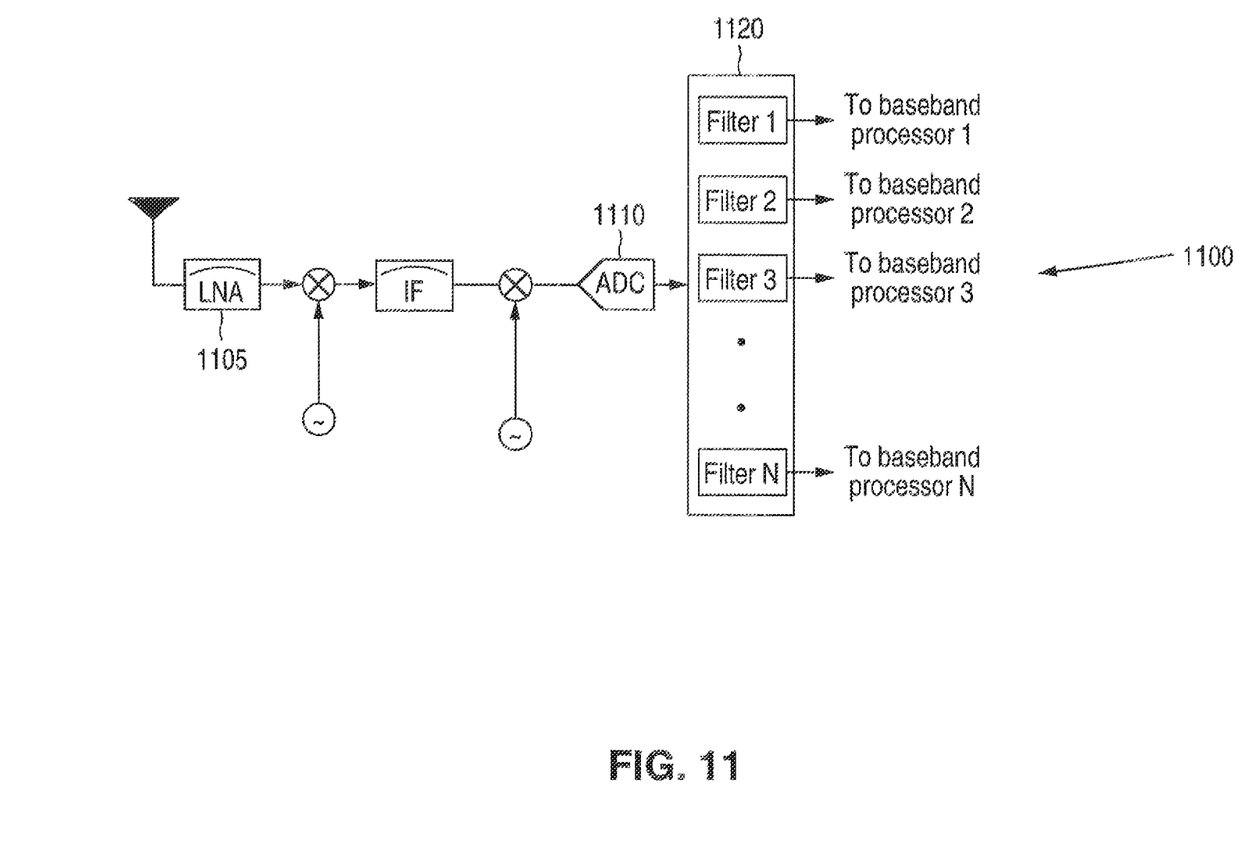
FIG. 11 is a block diagram illustrating a RF front end receiver architecture according to one embodiment of the present invention.

FIG. 11 is a block diagram illustrating a RF front end receiver architecture 1100 according to an embodiment of the present invention. RF front end architecture 1100 is suitable for the special case when a device is used to send a fragmented message or multiple messages over multiple identical networks (e.g., all GSM networks or all CDPD networks, etc.). However, architecture 1100 is preferably constructed for use with a hybrid combination of networks. Architecture 1100 comprises a low noise amplifier ("LNA") 1105, a high rate analog to digital converter ("ADC") 1110 and a bank of digital 1120 comprising Filters 1 through N connected in parallel. The components are electrically connected as illustrated in FIG. 11 by the lines between those components.

Architecture 1100 functions as follows. Upon passing through LNA 1105 and wherein an intermediate frequency ("IF") is generated, a large spectrum bandwidth (e.g., several MHz) is down-converted to baseband and sampled using ADC 1110. The rate of ADC 1110 is preferably at least twice the size of the down-converted frequency band. digital filter bank 1120 is used to tune to the receive frequency of each of the subject networks. Note that the digital filters are identical if the receiver is performing parallel detection of homogeneous transmitted signals. Homogenous transmitted signals are signals which have a format defined according to the same air interface as opposed to heterogeneous transmitted signals which are signals transmitted according to different air interfaces. The output of digital filter bank 1120 represents multiple baseband signals each representing a specific data network. The baseband signals are passed to a single (or multiple) baseband processors to retrieve the message fragments in a way similar to what is disclosed in connection with FIG. 4.

The embodiments of the method and apparatus for distributed data transfer over multiple independent wireless networks described above are illustrative of the principles of various aspects the present invention and are not limited to the particular embodiments described. Also, while, in some instances, embodiments are described in which a message is fragmented and sent across two or more networks simultaneously, it should be understood that two or more independent messages or files can be sent across the two or more networks simultaneously in these embodiment. It should also be understood that when two or more independent messages or files are being sent across multiple networks as described herein any of the two or more independent messages can, in addition, be fragmented and sent across the multiple networks simultaneously. Other embodiments of the present invention can be adapted for use in any RF wireless environment. Accordingly, while various embodiments of the invention have been illustrated and described, it will be appreciated that various changes can be made therein without departing from the spirit and scope of the invention.

What is claimed is:

1. A method for transmitting a multiple independent messages across multiple independent networks from a single transmitting unit to a single receiving unit, the method comprising: selecting at least two available transmitting sources for transmitting the multiple independent messages to the receiving unit; selecting a first independent network from the multiple independent networks for transmitting a first of the multiple independent messages from the single transmitting unit to the single receiving unit according to at least one predetermined criteria; selecting a second independent network from the multiple independent networks for transmitting a second of the multiple independent messages from the single transmitting unit to the single receiving unit according to at least one predetermined criteria; transmitting the first independent message from the single transmitting unit to the single receiving unit via the first independent network and simultaneously sending the second independent message from the single transmitting unit to the single receiving unit via the second independent network.

2. The method of claim 1, wherein at least one of the first or second independent messages includes a data file.

3. The method of claim 1, wherein at least one of the first or second independent messages includes a voice stream.

4. The method of claim 1, wherein at least one of the first or second independent messages includes a video stream.

5. The method of claim 1, wherein at least one of the first or second independent messages includes a File Transfer Protocol (FTP) file.

6. The method of claim 1, wherein at least one of the multiple independent messages includes a HyperText Transfer Protocol (HTTP) session.

7. The method of claim 1, wherein at least one of the first or second independent networks includes a Worldwide Interoperability for Microwave Access (WiMAX) network.

8. The method of claim 1, wherein at least one of the first or second independent networks includes a Long Term Evolution (LTE) network.

9. The method of claim 1, wherein at least one of the first or second independent networks includes a 1× Evolution-Data Optimized (1×EVDO) network.

10. The method of claim 1, wherein at least one of the first or second independent networks includes a High Speed Packet Access (HSPA) network.

11. A multimode device configured for running at least two applications simultaneously, the multimode device comprising:
a first communication interface for communicating with a first server via a first network;
a second communication interface for communicating with a second server via a second network;
wherein one of the at least two applications communicates with the first server via the first network and another of the at least two applications communicates with the second server via the second network.

12. The multimode device of claim 11, wherein at least one of the first or second independent networks includes a Worldwide Interoperability for Microwave Access (WiMAX) network.

13. The multimode device of claim 11, wherein at least one of the first or second independent networks includes a Long Term Evolution (LTE) network.

14. The multimode device of claim 11, wherein at least one of the first or second independent networks includes a 1× Evolution-Data Optimized (1×EVDO) network.

15. The multimode device of claim 11, wherein at least one of the first or second independent networks includes a High Speed Packet Access (HSPA) network.

16. A multimode transmitting device configured for transmitting multiple independent files across multiple independent networks, the multimode transmitting device comprising:
a first communication interface for communicating with a first of the multiple independent networks;
a second communication interface for communicating with a second of the multiple independent networks;
wherein the device is configured to transmit a first of the multiple independent files across the first independent network while simultaneously transmitting a second of the multiple independent files across the second independent network.

17. The multimode transmitting device of claim 16, wherein at least one of the first or second independent files is a voice stream.

18. The multimode transmitting device of claim 16, wherein at least one of the first or second independent files is a video stream.

19. The multimode transmitting device of claim 16, wherein at least one of the first or second independent files is a File Transfer Protocol (FTP) file.

20. The multimode transmitting device of claim 16, wherein at least one of the first or second independent files is a HyperText Transfer Protocol (HTTP) session.

* * * * *